(12) United States Patent
Pasutanon et al.

(10) Patent No.: US 8,939,316 B2
(45) Date of Patent: Jan. 27, 2015

(54) METHOD FOR PRODUCING BLOW-MOLDED CONTAINERS AND BLOW-MOLDED CONTAINER

(75) Inventors: Pisarn Pasutanon, Hamburg (DE); Matthias Gernhuber, Hamburg (DE); Stefan Amariglio, Hamburg (DE); Arne Wiese, Ahrensberg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 13/813,068

(22) PCT Filed: Jul. 26, 2011

(86) PCT No.: PCT/DE2011/001537
§ 371 (c)(1),
(2), (4) Date: Apr. 5, 2013

(87) PCT Pub. No.: WO2012/013188
PCT Pub. Date: Feb. 2, 2012

(65) Prior Publication Data
US 2013/0186848 A1     Jul. 25, 2013

(30) Foreign Application Priority Data
Jul. 29, 2010   (DE) .......................... 10 2010 033 377

(51) Int. Cl.
*B65D 6/02*     (2006.01)
*B65D 6/38*     (2006.01)
(Continued)

(52) U.S. Cl.
CPC ............ *B65D 23/102* (2013.01); *B29D 22/003* (2013.01); *B65D 1/42* (2013.01); *B29C 49/06* (2013.01); *B29C 49/48* (2013.01); *B29L 2031/7158* (2013.01); *B65D 2501/0027* (2013.01); *B65D 2501/0036* (2013.01)
USPC ........... 220/669; 220/671; 220/672; 220/673; 220/675; 215/687; 215/382

(58) Field of Classification Search
USPC .................. 215/384, 382; 220/675, 711, 669, 220/671–673; 222/466
See application file for complete search history.

(56) References Cited

U.S. PATENT DOCUMENTS

| | | | |
|---|---|---|---|
| 4,076,071 A | 2/1978 | Rosenkranz et al. | |
| 4,863,046 A | * 9/1989 | Collette et al. | ................ 215/381 |

(Continued)

FOREIGN PATENT DOCUMENTS

| | | |
|---|---|---|
| DE | 2352926 | 4/1975 |
| DE | 4212583 | 10/1993 |

(Continued)

*Primary Examiner* — Fenn Mathew
*Assistant Examiner* — Jennifer Castriotta
(74) *Attorney, Agent, or Firm* — Lucas & Mercanti, LLP; Klaus P. Stoffel (57) ABSTRACT

A blow-molded container includes an opening section that can be closed, a side wall, and a closed bottom. The material in the region of the side wall is shaped by blow forming an injection-molded preform. At least three recessed grips are arranged along an outer perimeter of the container. At least two longitudinal ribs oriented in a longitudinal direction of the container are arranged between each pair of recessed grips. The longitudinal ribs are separated from each other by a recess, which also extends in a longitudinal direction. At least one circumferential rib, which extends in a circumferential direction of the container, is arranged inside each of the recessed grips.

18 Claims, 8 Drawing Sheets

(51) Int. Cl.
   *B65D 8/12* (2006.01)
   *B65D 23/10* (2006.01)
   *B29D 22/00* (2006.01)
   *B65D 1/42* (2006.01)
   *B29C 49/06* (2006.01)
   *B29C 49/48* (2006.01)
   *B29L 31/00* (2006.01)

(56) References Cited

U.S. PATENT DOCUMENTS

| | | | |
|---|---|---|---|
| 5,238,129 A * | 8/1993 | Ota | 215/381 |
| 5,279,433 A * | 1/1994 | Krishnakumar et al. | 215/381 |
| 5,303,834 A * | 4/1994 | Krishnakumar et al. | 215/381 |
| 5,346,386 A | 9/1994 | Albrecht et al. | |
| 5,648,026 A | 7/1997 | Weiss | |
| 5,704,503 A * | 1/1998 | Krishnakumar et al. | 215/381 |
| 6,044,997 A * | 4/2000 | Ogg | 215/381 |
| 6,929,138 B2 * | 8/2005 | Melrose et al. | 215/381 |
| 7,552,833 B2 | 6/2009 | Tsutsui et al. | |
| 7,823,737 B2 * | 11/2010 | Noll et al. | 215/381 |
| 8,113,369 B2 * | 2/2012 | Mast et al. | 215/381 |
| 2001/0037992 A1 | 11/2001 | Tanabe et al. | |
| 2008/0087628 A1 * | 4/2008 | Bangi et al. | 215/384 |
| 2009/0095701 A1 | 4/2009 | Forsthovel | |
| 2010/0163515 A1 | 7/2010 | Nemoto | |

FOREIGN PATENT DOCUMENTS

| | | |
|---|---|---|
| DE | 4340291 | 6/1995 |
| DE | 19906438 | 8/2000 |
| EP | 0324305 Y | 7/1989 |
| EP | 2050677 A | 4/2009 |
| JP | 2007168809 A | 7/2007 |
| JP | 2008162621 A | 7/2008 |
| JP | 2008296926 A | 12/2008 |
| WO | 2009028571 A | 3/2009 |

\* cited by examiner

METHOD FOR PRODUCING BLOW-MOLDED CONTAINERS AND BLOW-MOLDED CONTAINER

The present application is a 371 of International application PCT/DE2011/001537, filed Jul. 26, 2011, which claims priority of DE 10 2010 033 377.8, filed Jul. 29, 2010, the priority of these applications is hereby claimed and these applications are incorporated herein by reference.

BACKGROUND OF THE INVENTION

The invention concerns a method for producing a blow-molded container with a closable mouth section, a side wall, and a closed base.

The invention also concerns a blow-molded container with a closable mouth section, a side wall, and a closed base.

In container molding by the action of blowing pressure, preforms made of a thermoplastic material, for example, preforms made of PET (polyethylene terephthalate), are fed to different processing stations within a blow-molding machine. A blow-molding machine of this type typically has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas comprises both the introduction of compressed gas into the developing container bubble and the introduction of compressed gas into the preform at the beginning of the blowing process.

The basic structure of a blowing station for container molding is described in DE-OS 42 12 583. Possible means of bringing the preforms to the desired temperature are explained in DE-OS 23 52 926.

Various handling devices can be used to convey the preforms and the blow-molded containers within the blow-molding machine. The use of transport mandrels, onto which the preforms are slipped, has proven especially effective. However, the preforms can also be handled with other supporting devices. Other available designs are grippers for handling the preforms and expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preforms occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are supported in a different way. In stationary blowing stations, which are suitable especially for accommodating several cavities for container molding, plates arranged parallel to one another are typically used as mold supports.

Before a heating operation is carried out, the preforms are typically slipped onto transport mandrels, which either convey the preforms through the entire blow-molding machine or merely revolve within the heating system. In the case of vertical heating of the preforms in such a way that the mouths of the preforms are oriented vertically downward, the preforms are usually placed on a sleeve-like mounting element of the transport mandrel. In the case of suspended heating of the preforms, in which the mouths of the preforms are oriented vertically upward, expanding mandrels are usually inserted into the mouths of the preforms to clamp them tightly.

Blow-molded containers of this type are used in a great variety of designs for the packaging of products. In particular, containers of this type are filled with carbonated and noncarbonated beverages.

An important cost factor in the manufacture of these containers is the weight of the material that is used. For one thing, the material is relatively expensive and, for another, it is necessary to heat the material before the blow molding is carried out, and this requires considerable energy input. Accordingly, there is an ongoing effort to reduce the amount of material used and to form the blow-molded containers with walls as thin as possible.

Of course, reduction of wall thickness also leads to reduced stability of the containers. Therefore, the side walls of the container are provided with special ribbing. Efforts are also made to reduce the wall thickness in the area of the base of the container.

It is typically necessary to satisfy a number of requirements in the area of the side walls. On the one hand, the container needs sufficient stability in the longitudinal direction to enable it to absorb force loads during filling. On the other hand, consumers demand recessed grips to allow more secure gripping and handling of the bottle. However, these recessed grips reduce stability.

SUMMARY OF THE INVENTION

Therefore, the objective of the present invention is to improve a method of the aforementioned type in such a way that the stability of the side walls of the containers is improved.

In accordance with the invention, this objective is achieved by subjecting an injection-molded preform to a heat treatment and molding it into a container by a blowing process in such a way that the material in the area of the side wall is molded by the blow-molding process in such a way that at least three recessed grips are arranged along the outer periphery of the container, between each pair of which are arranged at least two longitudinal ribs oriented in the longitudinal direction of the container, which are separated from each other by a recess that also extends in the longitudinal direction, and that at least one peripheral rib, which extends in the peripheral direction of the container, is located within each of the recessed grips.

A further objective of the present invention is to design a container of the aforementioned type in such a way that improved stability properties are obtained.

In accordance with the invention, this objective is achieved by virtue of the fact that the material in the area of the side wall is molded in such a way by blow molding an injection-molded preform that at least three recessed grips are arranged along the outer periphery of the container, between each pair of which are arranged at least two longitudinal ribs oriented in the longitudinal direction of the container, which are separated from each other by a recess that also extends in the longitudinal direction, and that at least one peripheral rib, which extends in the peripheral direction of the container, is located within each of the recessed grips.

The arrangement of at least three recessed grips along the outer periphery of the container helps with reliable manual grasping of the container in any position of the container relative to a user. The arrangement of the longitudinal ribs between the recessed grips stabilizes the container in the longitudinal direction. The distribution to at least two longitudinal ribs separated by a recess further improves the stability of the container. The arrangement of the longitudinal ribs inside the recessed grips stabilizes the container with respect to manual deformation when grasped by a user. Furthermore, contour stability in storage is promoted.

Increased stability when the container is grasped is achieved if at least three peripheral ribs extend peripherally within the recessed grip, at least one of which is arranged at a different level in the radial direction of the container than at least one of the other peripheral ribs.

Increased stability when the container is grasped is achieved if three peripheral ribs are arranged one above the other in the area of a radially inner base of the recessed grip.

A further increase in the stability of the container under mechanical load can be achieved if, in the longitudinal direction of the container, the base of the recessed grip makes a transition into the area of the side wall of the container both vertically upward and vertically downward by means of at least two stepped peripheral ribs.

A good compromise between moldability by blow-molding technology and high stability is achieved if the recess separating the longitudinal ribs from each other is provided with a depth in the radial direction of the container which is at most 50% of the height of the longitudinal ribs in the radial direction of the container.

A good functional design is obtained if the vertical cross-sectional area of the recessed grip has a trapezoidal contour.

High stability to forces acting from the outside is achieved if, in a vertical cross-sectional area, at least one of the peripheral ribs is defined, at least sectionally, by a circular segment and curves radially outward.

Mutual support of the peripheral ribs is achieved if at least two adjacent peripheral ribs are molded with an angular transition relative to each other.

Specific embodiments of the invention are schematically illustrated in the drawings.

DETAILED DESCRIPTION OF THE INVENTION

Figure 1:
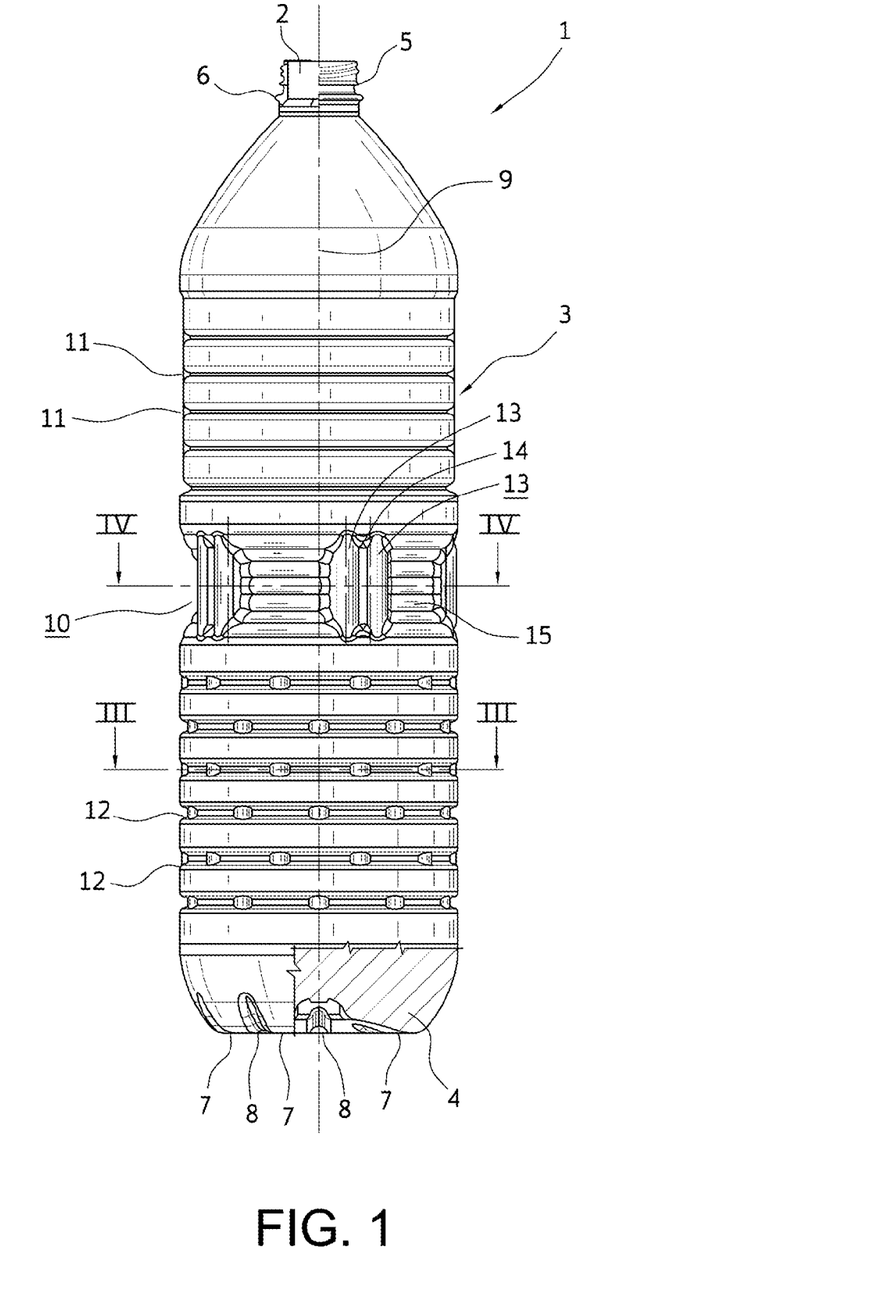
FIG. 1 is a schematic drawing of a blow-molded container with recessed grips.

FIG. 1 shows a blow-molded container 1 with a mouth section 2, side walls 3, and a base 4. The mouth section 2 has an external thread 5 and is separated from the side walls 3 by a support ring 6.

The base 4 is provided with several base supports 7 separated by spaces 8. The container 1 extends along a longitudinal axis 9.

Several recessed grips 10 are arranged along the outer circumference of the container 1. In particular, the use of at least three recessed grips 10 is proposed. The specific embodiment in FIG. 1 shows the use of five recessed grips 10. In the embodiment illustrated in FIG. 1, the recessed grips 10 are arranged in a middle section of the container 1 with respect to the direction of the longitudinal axis 9. The region of the container 1 located vertically above the recessed grips 10 is provided with peripheral ribs 11. The region of the container 1 located vertically below the recessed grips 10 is likewise provided with peripheral ribs 12. The ribs 11, 12 are typically realized as groove-like depressions extending in the direction of the interior of the container 1. However, they can also take the form of ring-shaped outward projections. Moreover, it is possible to use not only peripheral ribs 11, 12 that extend completely around the container 1 but also peripheral ribs 11, 12 that are segmented.

Figure 2:
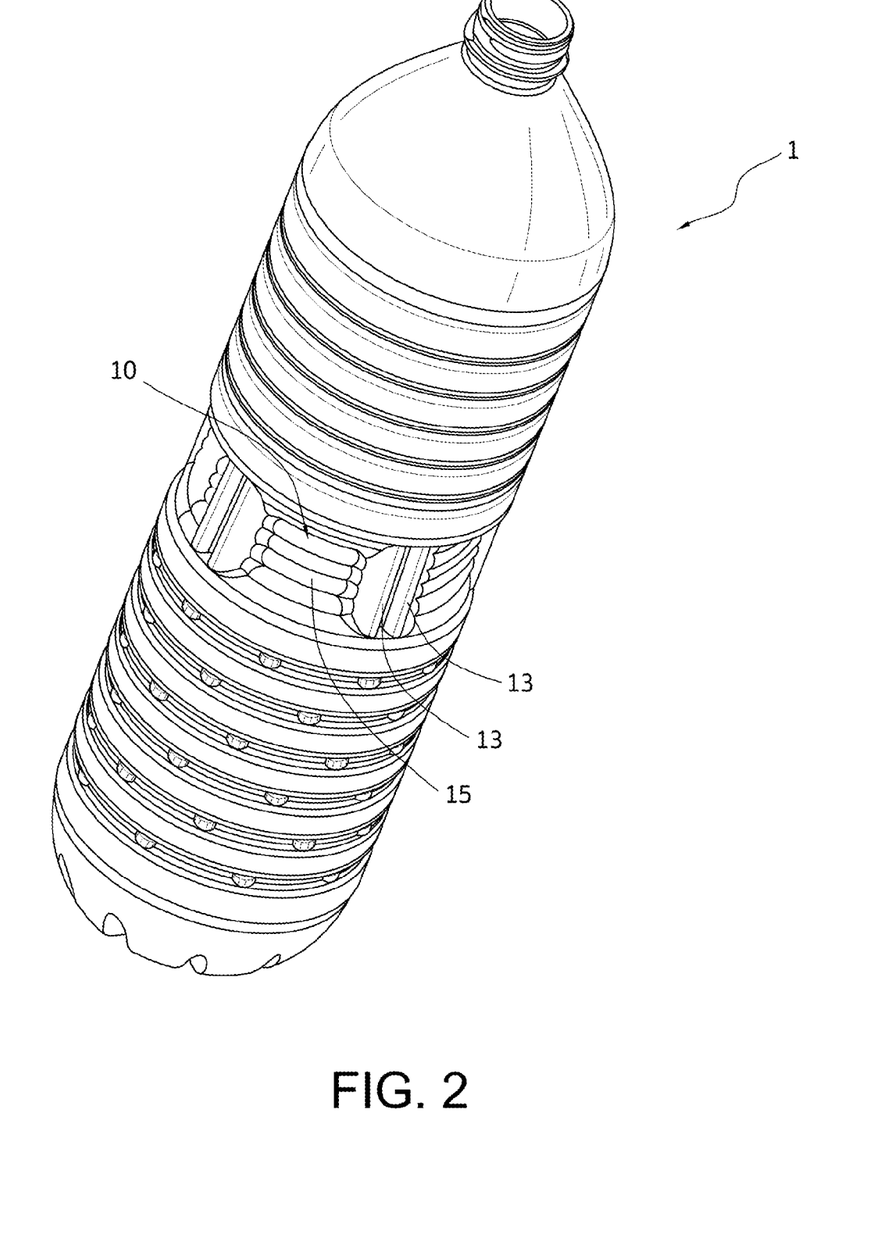
FIG. 2 is a perspective view of the container of FIG. 1.
Figure 3:
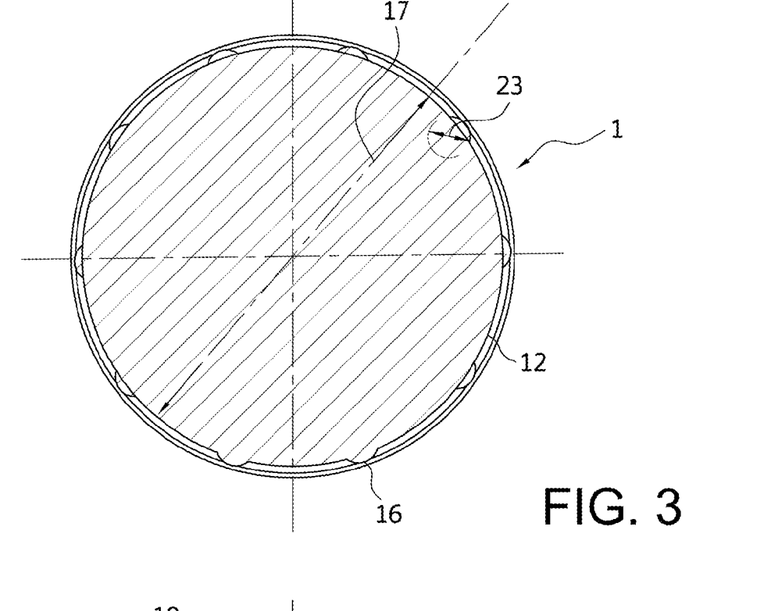
FIG. 3 is a cross section along sectional line III-III in FIG. 1.

Longitudinal ribs 13 are arranged between the recessed grips 10. In the specific embodiment in FIG. 1, two longitudinal ribs 13 are arranged side by side between each pair of recessed grips 10. These two longitudinal ribs 13 are separated by a recess 14. At least one peripheral rib 15 is arranged inside each recessed grip 10. FIG. 1 shows the use of five peripheral ribs 15 in each of the recessed grips 10. The perspective view in FIG. 2 again illustrates the design of the container 1 according to FIG. 1. This view clearly shows the arrangement of the peripheral ribs 15 inside the recessed grips 10 and the comparatively flat design of the outside surface of the longitudinal ribs 13. The horizontal cross section in FIG. 3 illustrates the depth of the ribs 12. In particular, the drawing shows that small-dimensioned outward projections 16 are present within the ribs 12. These outward projections 16 increase the stability of the container 1 and to a viewer have the appearance of drops. The horizontal cross section in FIG. 4 shows especially the depth of the recessed grips 10.

For a volume of the container 1 of, for example, about 1.5 liters, its weight is about 18 grams. For a container 1 of about this size, a diameter 17 in FIG. 3 is about 82.8 millimeters, and a diameter 18 in FIG. 4 is about 76.3 millimeters.

In regard to the container 1 in FIG. 1, which is designed as a bottle, its length in the direction of the longitudinal axis 9 is about 309 millimeters. The upper ribs 11 extend over a length of about 60 millimeters. FIG. 1 shows the use of five ribs 11. The lower ribs 12 extend over a length of about 80 millimeters. The embodiment in FIG. 1 illustrates the use of six ribs 12.

Figure 4:
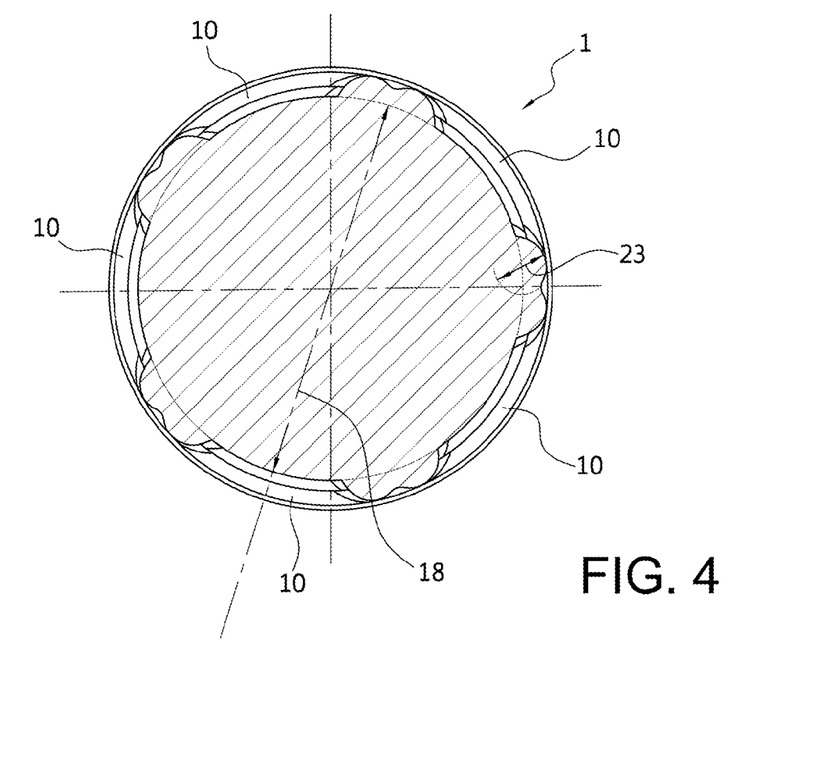
FIG. 4 is a cross section along sectional line IV-IV in FIG. 1.
Figure 5:
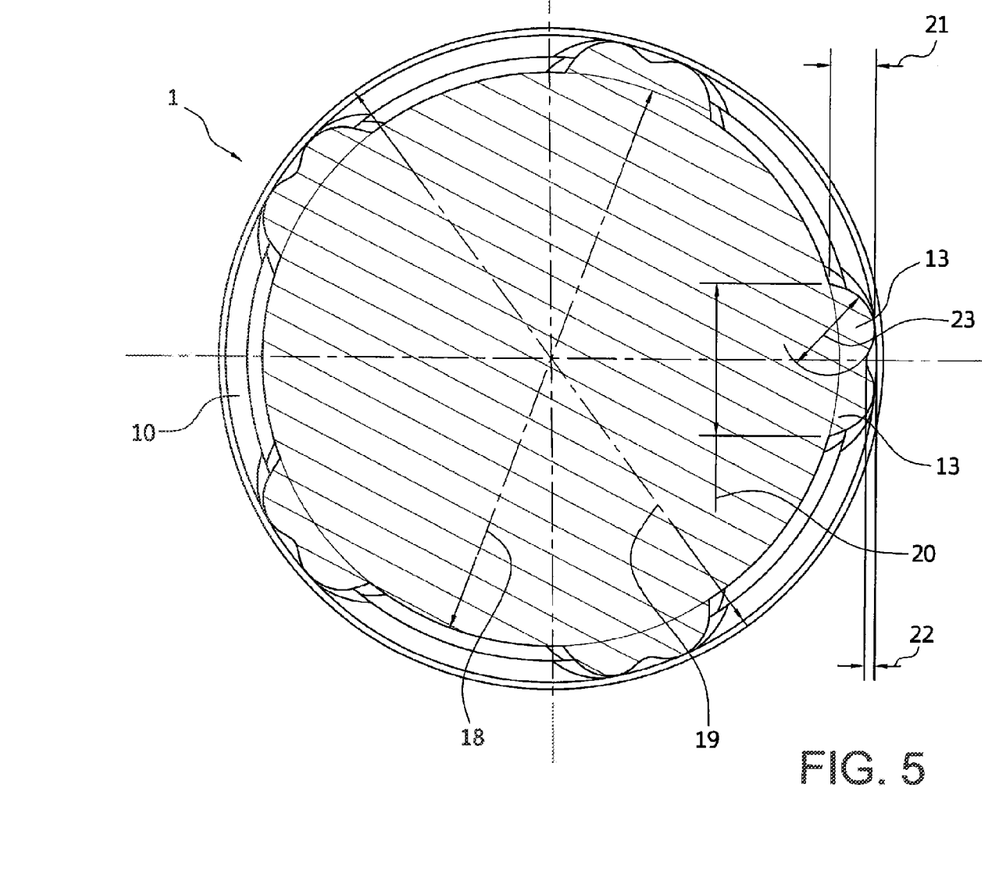
FIG. 5 is a cross section corresponding to FIG. 4 with additional dimensioning examples incorporated.

FIG. 5 illustrates a horizontal section corresponding to FIG. 4 with additional dimensioning drawn in. The diameter 18 is about 85% of the outside diameter 19. The diameter 18 is typically about 75% to 95% of the outside diameter 19.

The combination of the longitudinal ribs 13 and the recess 14 extends about 20 millimeters in the peripheral direction of the container 1. The width 20 of the combination is typically about 15-25 millimeters. In a direction that runs parallel to the radial direction of the container 1, a maximum extent of the longitudinal ribs 13 is about one fourth of the difference between the diameters 17 and 18. The values are in the range of 0.05 to 0.5 multiplied by the difference between the diameters 17 and 18.

A depth 22 of the recess 14 measured from a maximum extent of the longitudinal ribs 13 is about 2.5 mm. A typical range is 0.5 to 5.0 millimeters.

The longitudinal ribs 13 have, at least sectionally, a cross sectional area similar to a segment of a circular surface. A diameter 23 of this circle is about 55% of the width 20. A range of 40% to 70% of the width 20 is typical for the diameter 23.

Figure 6:
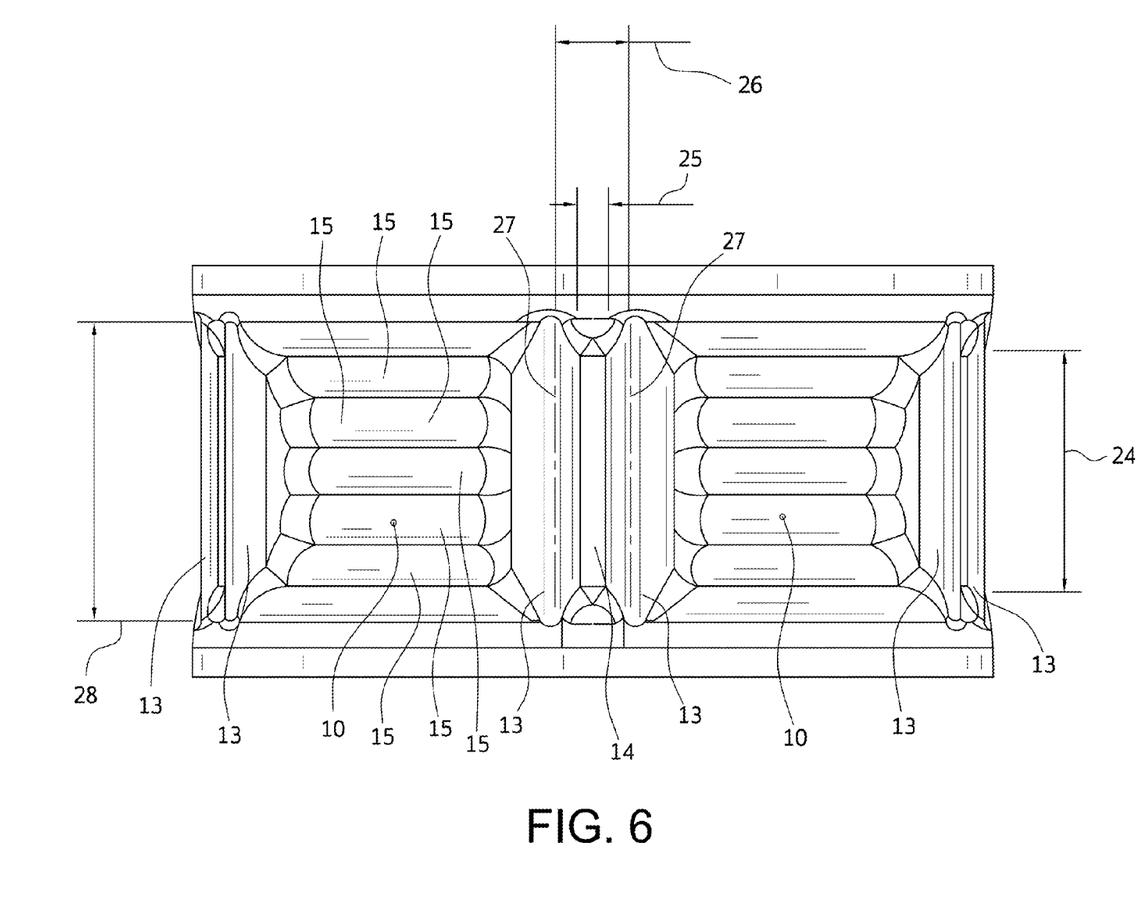
FIG. 6 is a side view of two recessed grips.

FIG. 6 illustrates examples of other possible dimensioning. The height 24 of the recessed grips 10 is about 24 millimeters. The value for the height 24 is typically in the range of 5 to 32 millimeters.

The width 25 of the recess 14 is about 2 millimeters. The value for the width 25 is typically in the range of 1 to 8 millimeters.

The distance 26 between the apex lines 27 of the longitudinal ribs 13 is about 8 millimeters. The value for this distance 26 is typically in the range of 6 to 12 millimeters. The apex lines 27 define the maximum radially outward extent of the longitudinal ribs 13.

The outside height 28 of the recessed grips 10 is about 5.3 times the distance 21 shown in FIG. 5.

Figure 7:
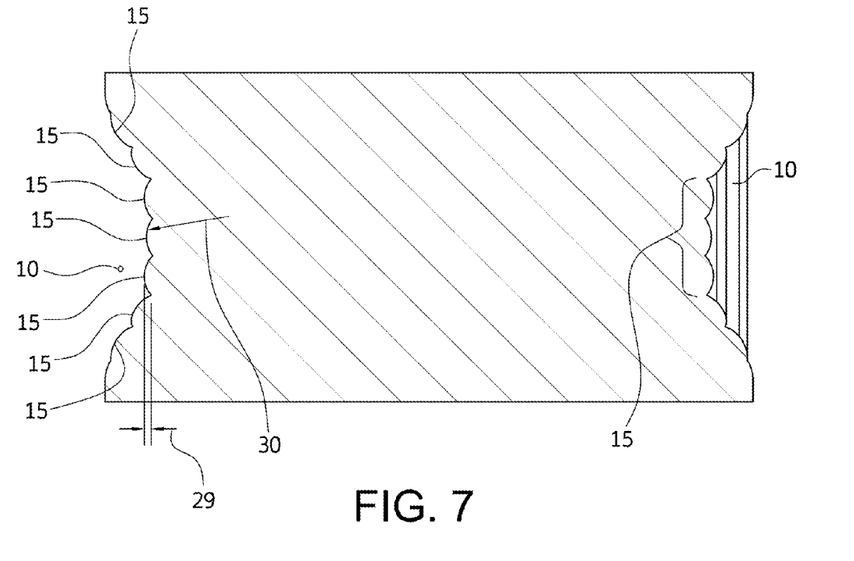
FIG. 7 is a partial view of an enlarged longitudinal section.

FIG. 7 is another schematic cross section that shows the rib-shaped contour of the recessed grips 10. The vertical section shown in FIG. 7 reveals the cross-sectional area of the recessed grips 10. Peripheral ribs 15 arranged at the bottom of the recessed grips 10 have a height 29 of about 1 to 2 millimeters. A height 29 of about 1 millimeter is preferred. The radius of curvature 30 of these peripheral ribs 15 is about 4 millimeters. A typical value for the radius 30 is in the range of 3-5 millimeters. The specific embodiment shown in FIG. 7 has three peripheral ribs 15 arranged side by side at the bottom of the recessed grip 10 with their vertices arranged in a common plane.

Figure 8:
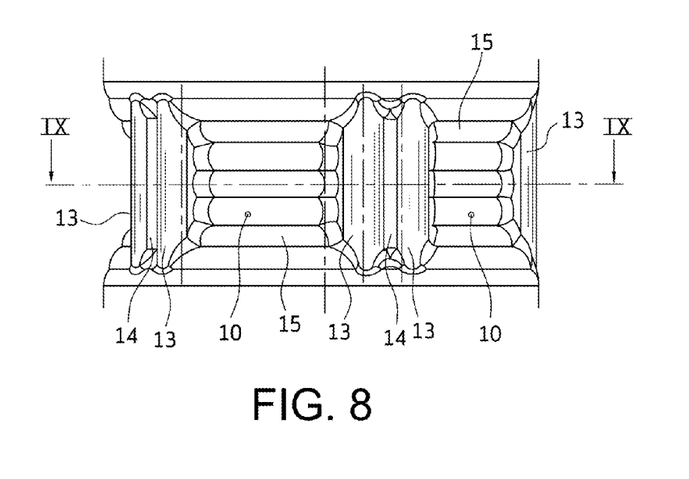
FIG. 8 is a view similar to FIG. 6 but from a different viewing direction.

The drawing in FIG. 8 shows essentially the same region of the container 1 as the drawing in FIG. 6 but with the container 1 rotated about the longitudinal axis into a slightly different position.

Figure 9:
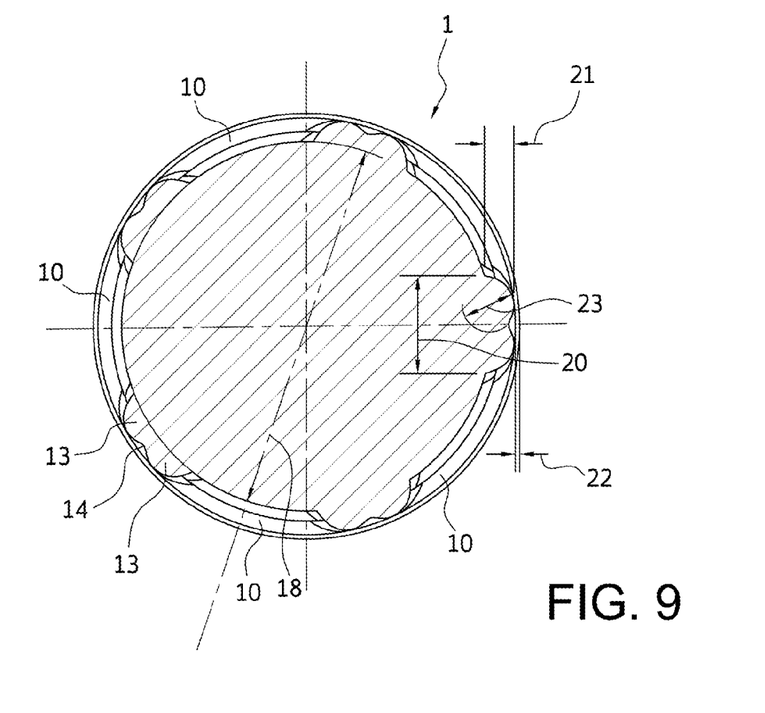
FIG. 9 is a cross section along sectional line IX-IX in FIG. 8.

FIG. 9 shows a horizontal section similar to FIG. 4 but with additional dimensioning specifications. It shows a specific case of the general dimensions of FIG. 5. In this specific case, the diameter 18 is about 76.3 millimeters, the width 20 is about 19.8 millimeters, the dimension 21 is about 6.13 millimeters, the depth 22 is about 0.66 millimeters, and the diameter 23 is about 11 millimeters.

Figure 10:
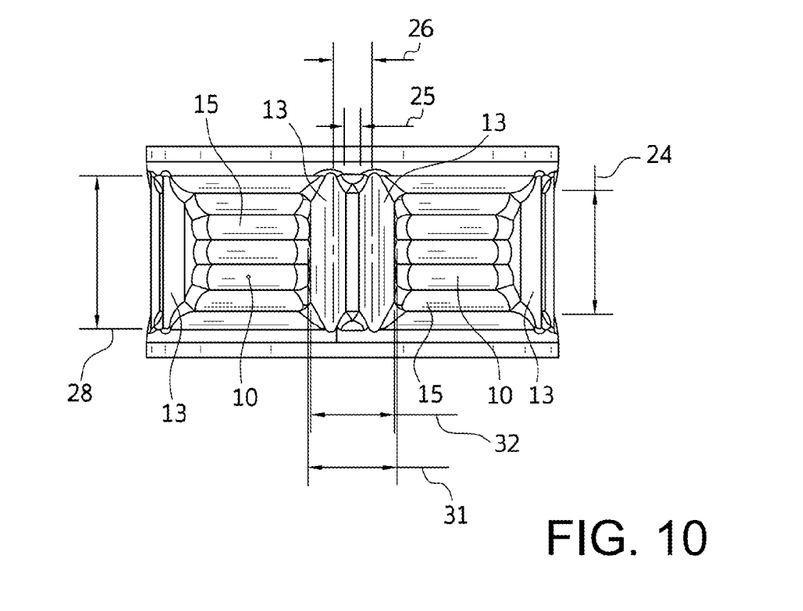
FIG. 10 is a view similar to FIG. 8 but with dimensional specifications.

FIG. 10 is basically the same as FIG. 6 with the following actual dimensioning specifications as examples. The height 24 is about 24.8 millimeters, the width 25 about 2.85 millimeters, the distance 26 about 8.0 millimeters, and the outside height 28 about 32.3 millimeters. Also indicated in the drawing with respect to the combination of two longitudinal ribs 13 and the recess 14 are an outside width 31 of about 19.4 millimeters and an inside width 32 of about 17.9 millimeters.

Figure 11:
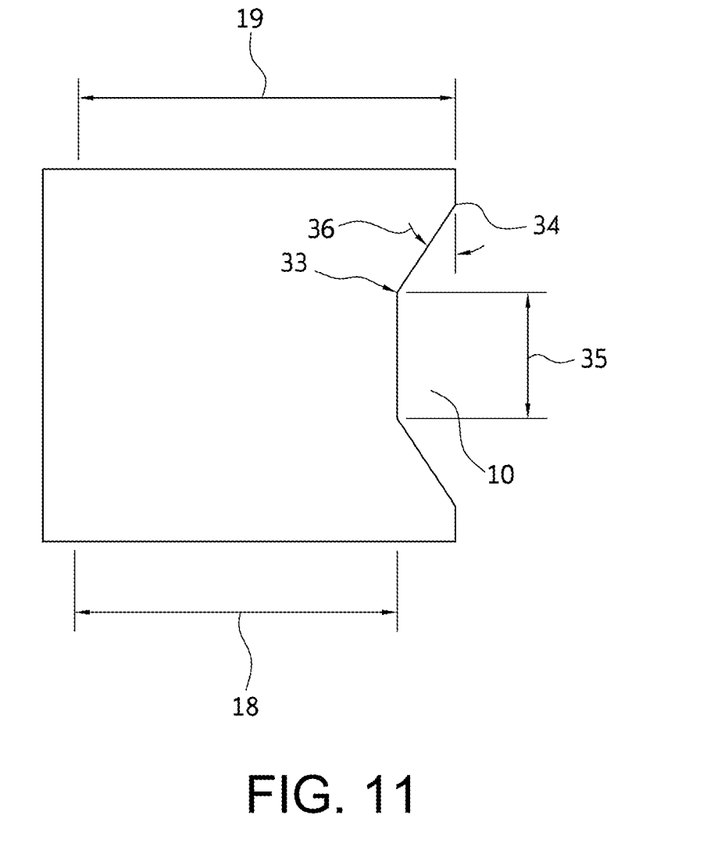
FIG. 11 is a schematic representation illustrating the geometry of a recessed grip.

FIG. 11 is a highly schematic drawing showing the recessed grip 10 without any actual representation of the peripheral ribs 15 and longitudinal ribs 13. In this drawing the recessed grip 10 has a trapezoidal cross-sectional area.

FIG. 11 again shows the diameters with reference numbers 18 and 19. A transition radius 33 between the base of the recessed grip 10 and the oblique side walls of the recessed grip 10 is about 1-5 millimeters. A value of about 1 millimeter is preferred. A radius 34 in the transition zone between the oblique side walls of the recessed grip 10 and the vertical region of the wall of the container 1 is about 6 millimeters. A value in the range of 2-15 millimeters can be used for the radius 34.

A base height 35 of the base of the recessed grip 10 is about 15 millimeters. A value in the range of 10-25 millimeters can be used for the base height 35. An angle 36 between the vertical course of the side wall of the container 1 and the oblique side wall of the recessed grip 10 is about 35 degrees. A value in the range of 25-45 degrees can be used for the angle 36.

The invention claimed is:

1. A method for producing a blow-molded container with a closable mouth section, a side wall with a radially outermost surface at a first radial distance from a longitudinal center axis of the containers and a closed base, the method comprising the steps of: subjecting an injection-molded preform to a heat treatment; and molding the preform into a container by a blowing process so that material in an area of the side wall is molded by the blow-molding process so that at least three recessed grips are arranged along an outer periphery of the container, wherein between each pair of recessed grips are arranged at least two longitudinal ribs that are oriented in a longitudinal direction of the container and have a radially outermost surface at a second radial distance from the longitudinal center axis of the container, the second radial distance being smaller than the first radial distance along the same horizontal plane, the longitudinal ribs are separated from each other by a recess that also extends in the longitudinal direction, and wherein at least one peripheral rib, which is shaped to extend a greater distance in the circumferential direction of the container than in the longitudinal direction of the container, is located within each of the recessed grips.

2. The method in accordance with claim 1, wherein at least three peripheral ribs extend circumferentially within the recessed grip, at least one of the peripheral ribs being arranged at a different level in a radial direction of the container than at least one other of the peripheral ribs.

3. The method in accordance with claim 1, wherein three peripheral ribs are arranged one above the other in an area of a radially inner base of the recessed grip.

4. The method in accordance with claim 1, wherein, in the longitudinal direction of the container, a base of the recessed grip makes a transition into the area of the side wall of the container both vertically upward and vertically downward by at least two stepped peripheral ribs.

5. The method in accordance with claim 1, wherein the recess separating the longitudinal ribs from each other has a depth in a radial direction of the container that is at most 50% of a height of the longitudinal ribs in the radial direction of the container.

6. The method in accordance with claim 1, wherein the recessed grips have a trapezoidal contour in a vertical cross-sectional surface.

7. The method in accordance with claim 1, wherein, in a vertical cross-sectional area, at least one of the peripheral ribs is defined, at least sectionally, by a circular segment and curves outward in a radial direction.

8. The method in accordance with claim 1, wherein at least two adjacent peripheral ribs are molded with an angular transition relative to each other.

9. The method in accordance with claim 1, wherein the at least one peripheral rib extends from one of the longitudinal ribs to another of the longitudinal ribs.

10. A blow-molded container, comprising: a closable mouth section; a side wall with a radially outermost surface at a first radial distance from a longitudinal center axis of the container; and a closed base wherein material in an area of the side wall is molded by blow-molding an injection-molded preform so that at least three recessed grips are arranged along an outer periphery of the container, wherein between each pair of recessed grips are arranged at least two longitudinal ribs that are oriented in a longitudinal direction of the container and have a radially outermost surface at a second radial distance from the longitudinal center axis of the container, the second radial distance being smaller than the first radial distance along the same horizontal plane, the longitudinal ribs are separated from each other by a recess that also extends in the longitudinal direction, and wherein at least one peripheral rib, which is shaped to extend a greater distance in the circumferential direction of the container than in the longitudinal direction of the container, is located within each of the recessed grips.

11. The container in accordance with claim 10, wherein each of the recessed grips has at least three peripheral ribs, at least one of the ribs being arranged at a different level in a radial direction of the container than at least one other of the peripheral ribs.

12. The container in accordance with claim 10, wherein at least three peripheral ribs are arranged one above the other in an area of a radially inner base of the recessed grip.

13. The container in accordance with claim 10, wherein a base of the recessed grip makes a stepped transition into the side wall of the container both vertically upward and vertically downward by at least two peripheral ribs.

14. The container in accordance with claim 10, wherein the recess separating the longitudinal ribs from each other has a depth in a radial direction of the container that is at most 50% of a height of the longitudinal ribs in the radial direction of the container.

15. The container in accordance with claim 10, wherein the recessed grips have a trapezoidal contour in a vertical cross-sectional surface.

16. The container in accordance with claim 10, wherein, in a vertical cross-sectional area, at least one of the peripheral ribs is defined, at least sectionally, by a circular segment and curves outward in a radial direction of the container.

17. The container in accordance with claim 10, wherein at least two peripheral ribs border each other at an angle.

18. The container in accordance with claim 10, wherein the at least one peripheral rib extends from one of the longitudinal ribs to another of the longitudinal ribs.

* * * * *